United States Patent [19]

Yoshida et al.

[11] Patent Number: 4,968,955
[45] Date of Patent: Nov. 6, 1990

[54] CARRIER PHASE SYNCHRONIZING CIRCUIT CAPABLE OF RECOVERING CARRIER PHASE SYNCHRONIZATION AT A SHORT TIME

[75] Inventors: Atsushi Yoshida, Tokyo; Takanao Suzuki, Shizuoka, both of Japan

[73] Assignee: NEC Corporation, Tokyo, Japan

[21] Appl. No.: 441,115

[22] Filed: Nov. 27, 1989

[30] Foreign Application Priority Data

Nov. 25, 1988 [JP] Japan .................................. 63-296324
Jan. 20, 1989 [JP] Japan ....................................... 1-9831

[51] Int. Cl.$^5$ ............................................. H03D 3/18
[52] U.S. Cl. ........................................ 329/304; 375/80
[58] Field of Search ................ 329/304, 306, 307, 310; 375/20, 39, 81, 120

[56] References Cited

U.S. PATENT DOCUMENTS 4,835,483 5/1989 Matsuura ............................. 329/310

Primary Examiner—David Mis
Attorney, Agent, or Firm—Foley & Lardner, Schwartz, Jeffery, Schwaab, Mack, Blumenthal & Evans

[57] ABSTRACT

In a receiver comprising a demodulator for demodulating a received signal into a demodulated signal, a carrier phase synchronizing circuit comprises a phase rotating circuit for phase rotating the demodulated signal into a phase-rotated signal in response to a phase rotation control signal, a first carrier phase extracting circuit for extracting a first carrier phase error estimation signal from the phase-rotated signal, a second carrier phase extracting circuit for extracting a second carrier phase error estimation signal from the phase-rotated signal, a comparator for comparing a second carrier phase estimated error value indicated by the second carrier phase error estimation signal with a threshold value to produce a comparison result signal, a selector for selecting one of the first and the second carrier phase error estimation signals as a selected carrier phase error estimation signal in response to the comparison result signal, and a low-pass filter for filtering the selected carrier phase error estimation signal to produce the phase rotation control signal. The low-pass filter may have a controllable passband controlled by a bandwidth control circuit which responds to the comparison result signal. The carrier phase synchronizing circuit may further comprise an equalizer for equalizing the demodulated signal before supply to the phase rotating circuit in response to an equalization control circuit which responds to the comparison result signal.

10 Claims, 10 Drawing Sheets

CARRIER PHASE SYNCHRONIZING CIRCUIT CAPABLE OF RECOVERING CARRIER PHASE SYNCHRONIZATION AT A SHORT TIME

BACKGROUND OF THE INVENTION

This invention relates to a carrier phase synchronizing circuit for use in a receiver for receiving a quadrature amplitude modulated signal as a received signal.

In general, a receiver of the type described is supplied through a transmission path with a quadrature amplitude modulated signal as a received signal. The quadrature amplitude modulated signal is specified by a plurality of signal points on a phase plane. The phase plane has an origin and real and imaginary axes orthogonally crossing at the origin. The signal points are in one-to-one correspondence to a plurality of signal values. In the quadrature amplitude modulated signal, a carrier carries a transmission data signal representative of a variable which is equal to one of the signal values at a time. It is therefore possible to understand that the quadrature amplitude modulated signal carries the transmission data signal.

The received signal is subjected to distortion by fading or the like. The receiver comprises a demodulator for demodulating the received signal into a demodulated signal which comprises an in-phase baseband signal and a quadrature baseband signal. The demodulated signal is supplied to an equalizer. Responsive to the demodulated signal, the equalizer equalizes the fading distortion to produce an equalized signal. The equalized signal is supplied to a carrier phase synchronizing circuit. Responsive to the equalized signal, the carrier phase synchronizing circuit establishes carrier phase synchronization. The demodulated signal may be directly supplied to the carrier phase synchronizing circuit without passage of the demodulated signal through the equalizer. The carrier phase synchronizing circuit is implemented by a phase lock loop (PLL). A known carrier phase synchronizing circuit establishes the carrier phase synchronization by phase-rotating the equalized signal so that a carrier phase estimated error value becomes zero. More specifically, the known carrier phase synchronizing circuit comprises a phase rotating circuit for phase rotating the equalized signal on the phase plane around the origin in response to a control signal to produce a phase-rotated signal indicative of a phase-rotated value, a carrier phase extracting circuit for carrying out a predetermined extracting operation on the phase-rotated signal to produce a carrier phase error estimation signal indicative of the carrier phase estimated error value which is equal to a difference between the variable and the phase-rotated value, and a low-pass filter for carrying out a low-pass filtering operation on the carrier phase error estimation signal to produce the control signal.

It should be noted that the carrier phase estimated error value is not always equal to the difference. That is, the carrier phase estimated error value is equal to the difference only when the difference is present within a synchronization establishing phase range equal to a range in which the carrier phase extracting circuit can exactly extract the carrier phase estimated error value as the difference. The synchronization establishing phase range is, for example, between about plus three degrees and minus three degrees. When the difference exceeds a range which is twice the synchronization establishing phase range, the carrier phase estimated error value becomes very small. Under the circumstances, the known carrier phase synchronizing circuit consumes a long time in recovering the carrier phase synchronization.

SUMMARY OF THE INVENTION

It is an object of this invention to provide a carrier phase synchronizing circuit which can recover carrier phase synchronization in a short time.

Other objects of this invention will become clear as the description proceeds.

A carrier phase synchronizing circuit to which this invention is applicable is for use in a receiver for receiving a quadrature amplitude modulated signal as a received signal. The quadrature amplitude modulated signal is specified by a plurality of signal points on a phase plane having an origin and real and imaginary axes orthogonally crossing at the origin. The signal points are in one-to-one correspondence to a plurality of signal values. The quadrature amplitude modulated signal carries a transmission data signal representative of a variable which is equal to one of the signal values at a time. The receiver comprises a demodulating means for demodulating the received signal into a demodulated signal.

According to a first aspect of this invention, the carrier phase synchronizing circuit comprises: (1) phase rotating means connected to the demodulating means for phase rotating the demodulated signal on the phase plane around the origin in response to a control signal to produce a phase-rotated signal indicative of a phase-rotated value; (2) first carrier phase error extracting means connected to the phase rotating means for carrying out a first predetermined extracting operation on the phase-rotated signal to produce a first carrier phase error estimation signal indicative of a first carrier phase estimated error value which is equal to a difference between the variable and the phase-rotated value; (3) second carrier phase error extracting means connected to the phase rotating means for carrying out a second predetermined extracting operation on the phase-rotated signal to produce a second carrier phase error estimation signal indicative of a second carrier phase estimated error value which is equal to another difference between the variable and the phase-rotated value; (4) comparing means connected to the second carrier phase error extracting means for comparing the second carrier phase estimated error value with a threshold value to produce a comparison result; (5) selecting means connected to the comparing means to the first and the second carrier phase error extracting means for selecting one of the first and the second carrier phase error estimation signals as a selected carrier phase error estimation signal in response to the comparison result signal; and (6) low-pass filtering means connected to the selecting means for carrying out a low-pass filtering operation on the selected carrier phase error estimation signal to produce the control signal.

According to a second aspect of this invention, the carrier phase synchronizing circuit comprises: (1) phase rotating means connected to the demodulating means for phase rotating the demodulated signal on the phase plane around the origin in response to a phase rotation control signal to produce a phase-rotated signal indicative of a phase-rotated value; (2) first carrier phase error extracting means connected to the phase rotating means for carrying out a first predetermined operation on the phase-rotated signal to produce a first carrier phase error estimation signal indicative of a first carrier phase estimated error value which is equal to a difference between the variable and the phase-rotated value; (3) low-pass filtering means having a controllable passband and connected to the first carrier phase error extracting means for carrying out a low-pass filtering operation on the first carrier phase error estimation signal with the controllable passband controlled by a bandwidth control signal to produce the phase rotation control signal; (4) second carrier phase error extracting means connected to the phase rotating means for carrying out a second predetermined extracting operation on the phase-rotated signal to produce a second carrier phase error estimation signal indicative of a second carrier phase estimated error value which is equal to another difference between the variable and the phase-rotated value; (5) comparing means connected to the second carrier phase error extracting means for comparing the second carrier phase estimated error value with a threshold value to produce a comparison result signal representative of a comparison result; and (6) bandwidth control means connected to the comparing means and to the low-pass filtering means for controlling the low-pass filtering means in response to the comparison result signal to produce the bandwidth control signal.

According to a third aspect of this invention, the carrier phase synchronizing circuit comprises: (1) equalizing means having varying correction coefficients and connected to the demodulating means for equalizing the demodulated signal into an equalized signal in response to a coefficient control signal; (2) phase rotating means connected to the equalizing means for phase rotating the demodulated signal on the phase plane around the origin in response to a phase rotation control signal to produce a phase-rotated signal indicative of a phase-rotated value; (3) first carrier phase error extracting means connected to the phase rotating means for carrying out a first predetermined extracting operation on the phase-rotated signal to produce a first carrier phase error estimation signal indicative of a first carrier phase estimated error value which is equal to a difference between the variable and the phase-rotated value; (4) low-pass filtering means having a controllable passband and connected to the first carrier phase error extracting means for carrying out a low-pass filtering operation on the first carrier phase error estimation signal with the controllable passband controlled by a bandwidth control signal to produce the phase rotation control signal; (5) second carrier phase error extracting means connected to the phase rotating means for carrying out a second predetermined extracting operation on the phase-rotated signal to produce a second carrier phase error estimation signal indicative of a second carrier phase estimated error value which is equal to another difference between the variable and the phase-rotated value; (6) comparing means connected to the second carrier phase error extracting means for comparing the second carrier phase estimated error value with a threshold value to produce a comparison result signal representative of a comparison result; (7) bandwidth control means connected to the comparing means and to the low-pass filtering means for controlling the low-pass filtering means in response to the comparison result signal to produce the bandwidth control signal; and (8) equalization control means connected to the comparing means and to the equalizing means for controlling the equalizing means in response to the comparison result signal to produce the coefficient control signal.

DESCRIPTION OF THE PREFERRED EMBODIMENTS

Figure 1:
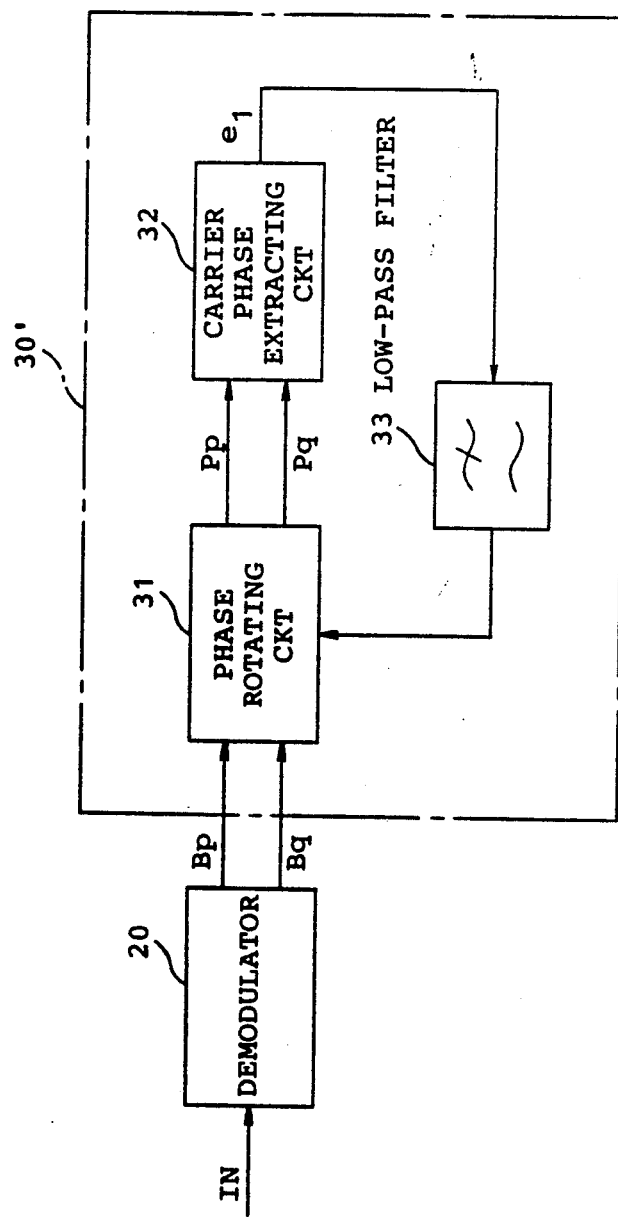
FIG. 1 is a block diagram of a receiver including a conventional carrier phase synchronizing circuit.

Referring to FIG. 1, a receiver will generally be described at first. The receiver receives a quadrature amplitude modulated signal as a received signal IN. It will be assumed merely for clarity of the description that the quadrature amplitude modulated signal is subjected to sixteen-by-sixteen quadrature amplitude modulation (256-QAM).

Figure 2:
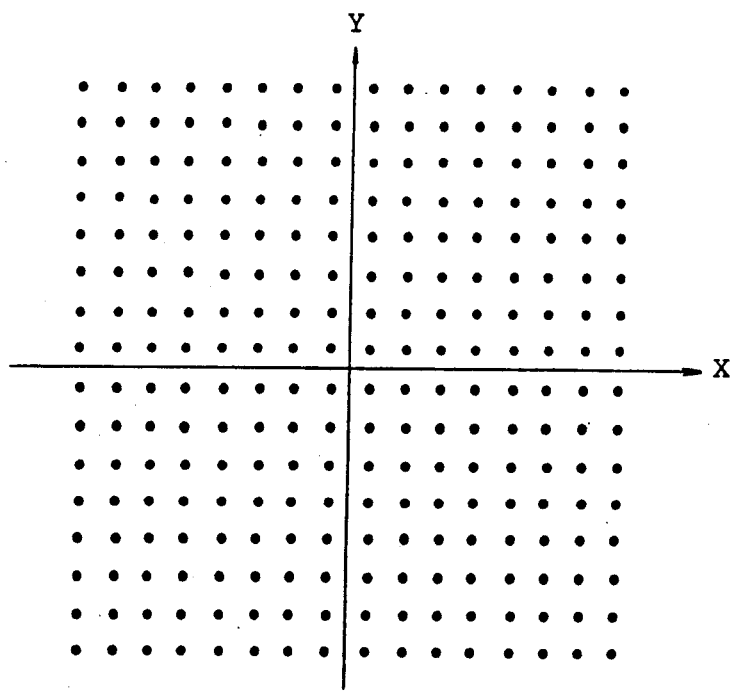
FIG. 2 shows a phase plane used in describing signal points of a quadrature amplitude modulated signal.

Turning to FIG. 2 for a short while, the quadrature amplitude modulated signal is specified by two hundred and fifty-six signal points on a phase plane having an origin and real and imaginary axes X and Y orthogonally crossing at the origin. The two hundred and fifty-six signal points are in one-to-one correspondence to two hundred and fifty-six signal values. In the quadrature amplitude modulated signal, a carrier carries a transmission data signal representative of a variable which is equal to one of the signal values at a time. It is therefore possible to understand that the quadrature amplitude modulated signal carries the transmission data signal.

Turning back to FIG. 1, the receiver comprises a demodulator 20 for demodulating the received signal IN into a demodulated signal. The demodulated signal comprises an in-phase baseband signal Bp and a quadrature baseband signal Bq. In other words, the demodulated signal is represented by (Bp+jBq) where j represents an imaginary unit which is equal to $\sqrt{-1}$.

In FIG. 1, a conventional carrier phase synchronizing circuit 30' will be described for a better understanding of this invention. The conventional carrier phase synchronizing circuit 30' is implemented by a phase lock loop (PLL). The conventional carrier phase synchronizing circuit 30' establishes the carrier phase synchronization by phase-rotating the demodulated signal so that a carrier phase estimated error value becomes zero. More particularly, the conventional carrier phase synchronizing circuit 30' comprises a phase rotating circuit 31 for phase rotating the demodulated signal on the phase plane around the origin in response to a phase rotation control signal to produce a phase-rotated signal indicative of a phase-rotated value. The phase-rotated signal is obtained by giving the demodulated signal a phase rotation of an angle which is proportional to a phase rotation control value indicated by the phase rotation control signal. The phase-rotated signal comprises an in-phase phase-rotated signal Pp and a quadrature phase-rotated signal Pq. In other words, the phase-rotated signal is represented by (Pp+jPq).

The phase-rotated signal is supplied to a carrier phase extracting circuit 32. The carrier phase extracting circuit 32 carries out a predetermined extracting operation on the phase-rotated signal to produce a carrier phase error estimation signal indicative of the carrier phase estimated error value $\theta_1$ which is equal to a difference between the variable and the phase-rotated value. The carrier phase error estimation signal is supplied to a low-pass filter 33. The low-pass filter 33 carries out a low-pass filtering operation on the carrier phase error estimation signal to produce the phase rotation control signal.

Figure 3:
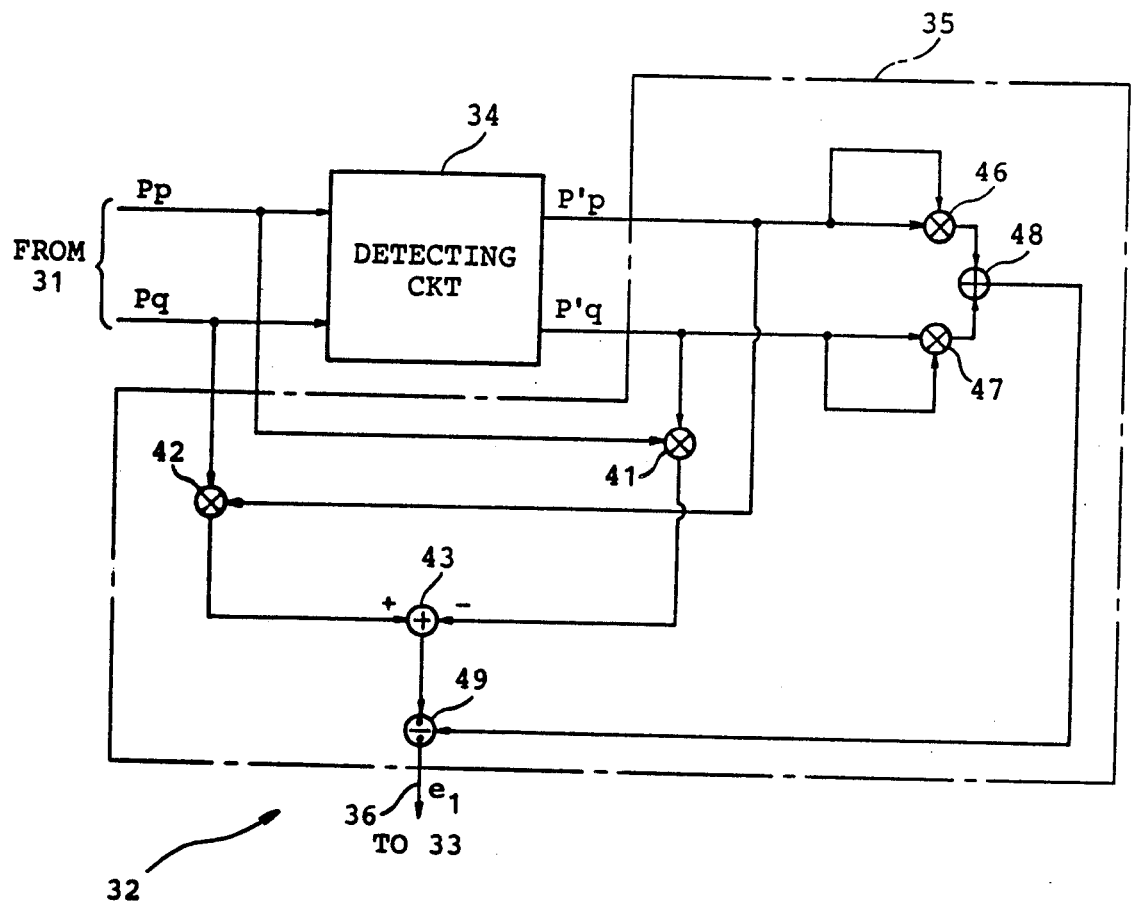
FIG. 3 is a block diagram of a carrier phase extracting circuit for use in the carrier phase synchronizing circuit illustrated in FIG. 1.

Referring to FIG. 3, the carrier phase extracting circuit 32 comprises a detecting circuit 34 which is supplied with the phase-rotated signal from the phase rotating circuit 31. The detecting circuit 34 detects, as a detected value, one of the signal values that is nearest to the phase-rotated value. The detecting circuit 34 produces a detected signal indicative of the detected value. The detected signal comprises an in-phase detected signal P'p and a quadrature detected signal P'q. In other words, the detected signal is represented by (P'p+jP'q).

The detected signal and the phase-rotated signal are supplied to a calculating circuit 35. The calculating circuit 35 calculates a calculated error value which is equal to a difference between the detected value and the phase-rotated value. The calculating circuit 35 produces a calculated error signal indicative of the calculated error value. The calculated error signal is supplied to the low-pass filter 33 (FIG. 1) through a connection line 36 as the carrier phase error estimation signal.

More specifically, the calculating circuit 35 comprises first and second multipliers 41 and 42 and a subtractor 43. The first multiplier 41 carries out a first multiplication operation on the in-phase phase-rotated signal Pp and the quadrature detected signal P'q to produce a first multiplication result signal indicative of a first multiplication result which is represented by (Pp×P'q). The second multiplier 42 carries out a second multiplication operation on the quadrature phase-rotated signal Pq and the in-phase detected signal P'p to produce a second multiplication result signal indicative of a second multiplication result which is represented by (Pq×P'p). The first and the second multiplication result signals are supplied to the subtractor 43. The subtractor 43 subtracts the first multiplication result from the second multiplication result to produce a subtraction result signal indicative of a subtraction result which is represented by (Pq×P'p−Pp×P'q). In other words, a combination of the first and the second multipliers 41 and 42 and the subtractor 43 carries out a first predetermined operation on the in-phase and the quadrature phase-rotated signals Pp and Pq and the in-phase and the quadrature detected signal P'p to produce a first operation result signal indicative of a first operation result which is represented by Im[(Pp+jPq)(P'p−jP'q)].

The calculating circuit 35 further comprises first and second square calculators 46 and 47 and an adder 48. The first square calculator 46 squares the in-phase detected signal P'p to produce a first squared result signal indicative of a first squared result which is represented by $(P'p)^2$. The second square calculator 47 squares the quadrature detected signal P'q to produce a second square result signal indicative of a second squared result which is represented by $(P'q)^2$. The first and the second squared result signals are supplied to the adder 48. The adder 48 carries out an addition operation on the first and the second squared result signals to produce an addition result signal indicative of an addition result which is represented by $((P'p)^2+(P'q)^2)$. In other words, a combination of the first and the second square calculators 46 and 47 and the adder 48 carries out a second predetermined operation on the in-phase and the quadrature detected signals P'p and P'q to produce a second operation result signal indicative of a second operation result which is represented by $((P'p)^2+(P'q)^2)$.

Supplied with the first and the second operation result signals, a divider 49 divides the first operation result by the second operation result to produce, as the carrier phase error estimation signal $e_1$, a division result signal indicative of a division result which is represented by Im[(Pp+jPq)(P'p−jP'q)]/$((P'p)^2+(P'q)^2)$.

Figure 4:
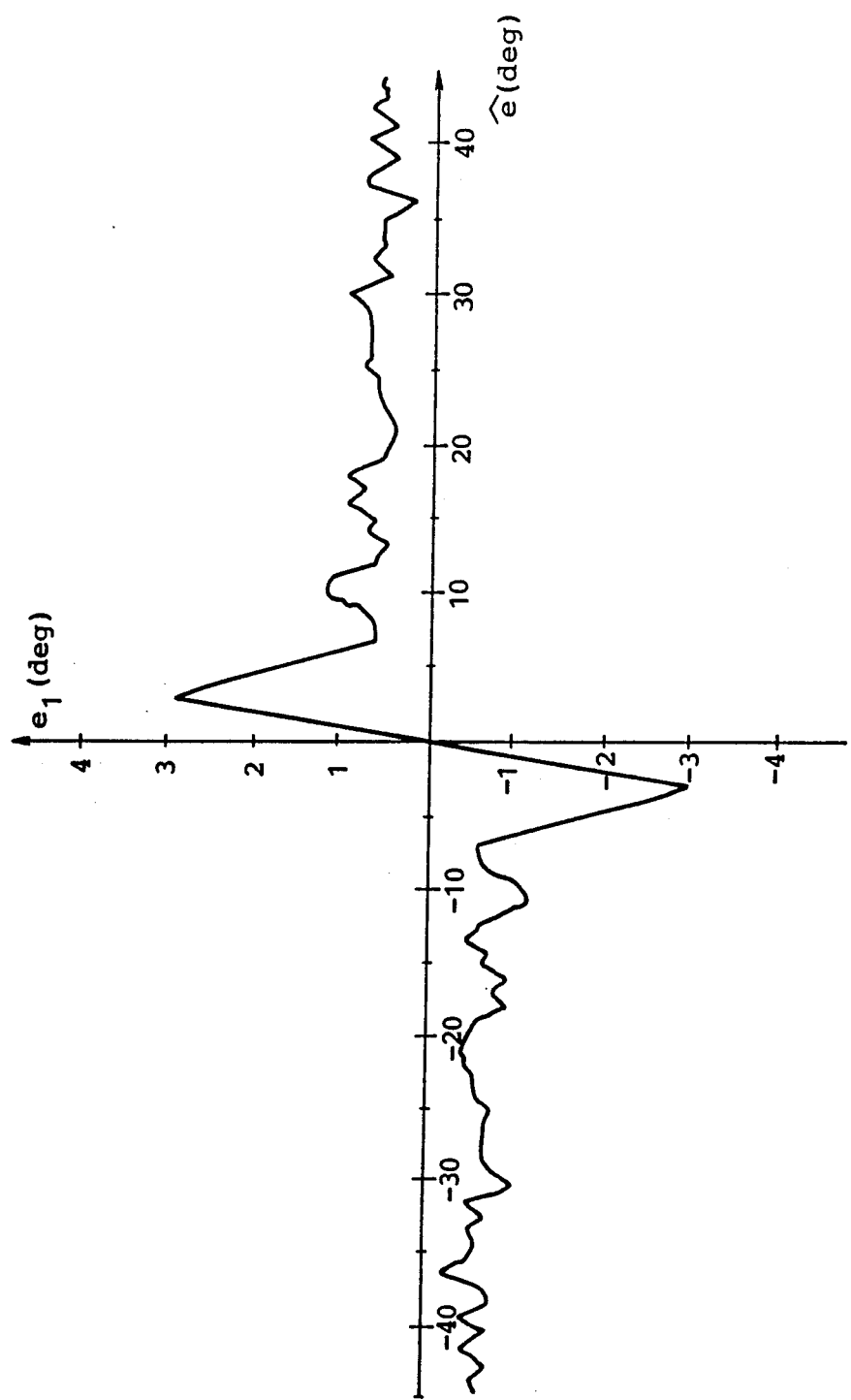
FIG. 4 shows a phase estimation characteristic of a carrier phase extracting circuit shown in FIG. 1.

Referring to FIG. 4, the abscissa and the ordinate represent a carrier phase error value ê and the carrier phase estimated error value $e_1$. FIG. 4 shows a phase estimation characteristic of the carrier phase extracting circuit 32 shown in FIG. 1. The carrier phase error value is always equal to a difference between the variable and the phase-rotated value. In the carrier phase extracting circuit 32, the carrier phase estimated error value $e_1$ is proportional to the carrier phase error value e while the carrier phase error value is present between about −3 (deg) and about +3 (deg) as shown in FIG. 4. Such a range is called a synchronization establishing phase range. As shown in FIG. 4, the carrier phase estimated error value $e_1$ becomes very small when the carrier phase error value exceeds a range which is twice the synchronization establishing phase range, namely, between about −6 (deg) and about +6 (deg). Under the circumstances, the conventional carrier phase synchronizing circuit 30' consumes a long time in recovering the carrier phase synchronization.

Figure 5:
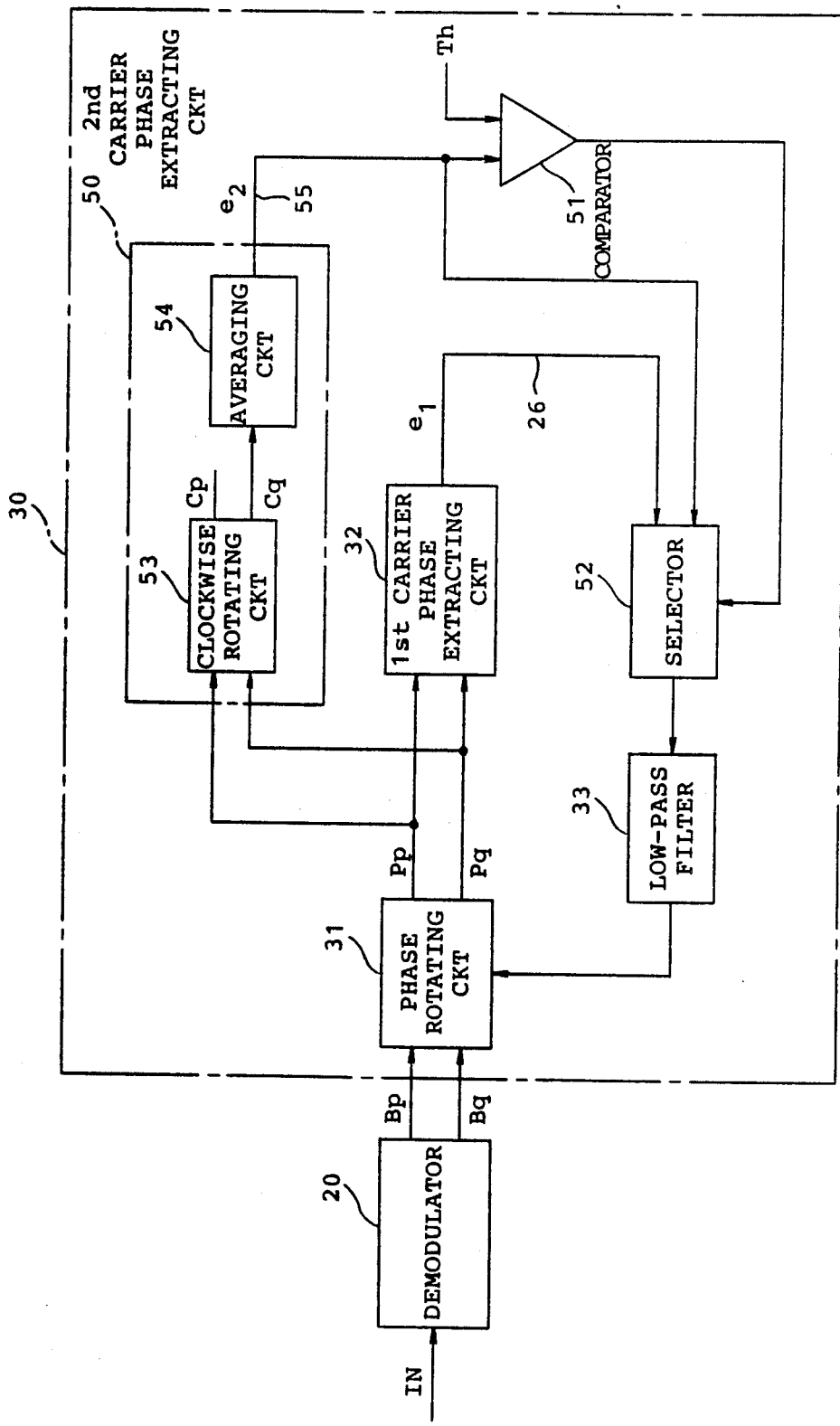
FIG. 5 is a block diagram of a receiver including a carrier phase synchronizing circuit according to a first embodiment of this invention.

Referring to FIG. 5, the description will be directed to a receiver which includes a carrier phase synchronizing circuit 30 according to a first embodiment of the present invention. The carrier phase synchronizing circuit 30 comprises the phase rotating circuit 31, the carrier phase extracting circuit 32, and the low-pass filter 33 which are similar to those illustrated in FIG. 1. The carrier phase synchronizing circuit 30 further comprises an additional carrier phase extracting circuit 50, a comparator 51, and a selector 52. The carrier phase extracting circuit 32 and the additional carrier phase extracting circuit 50 will hereafter be called a first and a second carrier phase extracting circuit. Accordingly, the first carrier phase extracting circuit 32 produces the carrier phase error estimation signal $e_1$ as a first carrier phase error estimation signal.

Supplied with the phase-rotated signal from the phase rotating circuit 31, the second carrier phase extracting circuit 50 carries out a second predetermined extracting operation on the phase-rotated signal to produce a second carrier phase error estimation signal indicative of a second carrier phase estimated error value $e_2$ which is equal to another difference between the variable and the phase-rotated value. The second carrier phase error estimation signal is supplied to the comparator 51 and the selector 52. The comparator 51 compares an absolute value of the second carrier phase estimated error value $e_2$ with a threshold value Th to produce a comparison result signal representative of a comparison result. In the illustrated embodiment, the threshold value Th indicates an angle which is equal to 3 (deg). The comparison result signal is supplied to the selector 52 which is supplied with the first and the second carrier phase error estimation signals. The selector 52 selects one of the first and the second carrier phase error estimation signals as a selected carrier phase error estimation signal in response to the comparison result signal. The selected carrier phase error estimation signal is supplied to the low-pass filter 33.

More particularly, the selector 52 selects the first carrier phase error estimation signal as the selected carrier phase error estimation signal when the comparison result represents that the absolute value of the second carrier phase estimated error value $e_2$ is less than the threshold value Th. Otherwise, the selector 52 selects the second carrier phase error estimation signal as the selected carrier phase error estimation signal.

That is, the carrier phase synchronizing circuit 30 acts as a first phase lock loop which is a combination of the phase rotating circuit 31, the first carrier phase extracting circuit 32, and the low-pass filter 33 when the absolute value of the second carrier phase estimated error value $e_2$ is less than the threshold value Th. The first phase lock loop is similar to the conventional carrier phase synchronizing circuit 30' as shown in FIG. 1. The first phase lock loop establishes the carrier phase synchronization in the manner described with reference to FIG. 1. When the absolute value of the second carrier phase estimated error value $e_2$ is greater than the threshold value Th, the carrier phase synchronizing circuit 30 serves as a second phase lock loop which is a combination of the phase rotating circuit 31, the second carrier phase extracting circuit 50, and the low-pass filter 33. The second phase lock loop can immediately recover the carrier phase synchronization even though the carrier phase error value ê exceeds between about −6 (deg) and about +6 (deg).

The second carrier phase extracting circuit 50 comprises a clockwise rotating circuit 53 connected to the phase rotating circuit 31. As shown in FIG. 2, the phase plane is divided into first through fourth quadrants. The clockwise rotating circuit 53 rotates the phase-rotated signal on the phase plane clockwise around the origin by an angle of (90n−45) degrees when the phase-rotated signal is present in an n-th quadrant where n is variable between 1 and 4. The clockwise rotating circuit 53 produces a clockwise rotated signal which has an in-phase and a quadrature component Cp and Cq on the real and the imaginary axes, respectively. The quadrature component Cp of the clockwise rotated signal is supplied to an averaging circuit 54. The averaging circuit 54 is for time averaging the quadrature component Cp of the clockwise rotated signal to produce a time-averaged signal. The time-averaged signal is supplied to the comparator 51 and the selector 52 through a connection line 55 as the second carrier phase error estimation signal.

Figure 6:
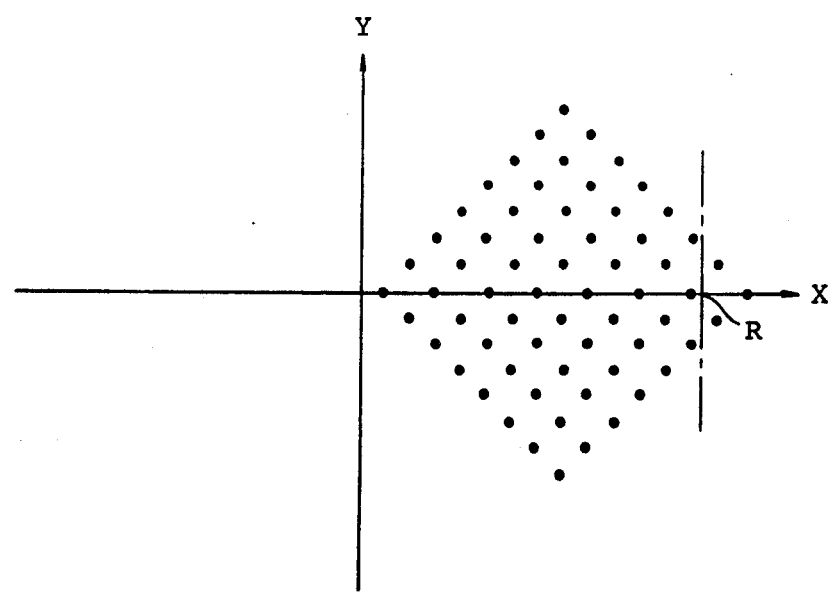
FIG. 6 shows a signal points for use in describing operation of a clockwise rotating circuit illustrated in FIG. 5.

Referring temporarily to FIG. 6, the clockwise rotated signal represents the signal points as shown. This is because the first quadrant of FIG. 2 is 45° clockwise rotated. The second quadrant is 135° clockwise rotated. This applies to the third and the fourth quadrants.

When the clockwise rotated signal is specified by signal points on the phase plane that are symmetrical with respect to one another on both sides of the real axis as shown in FIG. 6, the time-averaged signal has a time-averaged value of zero.

Figure 7:
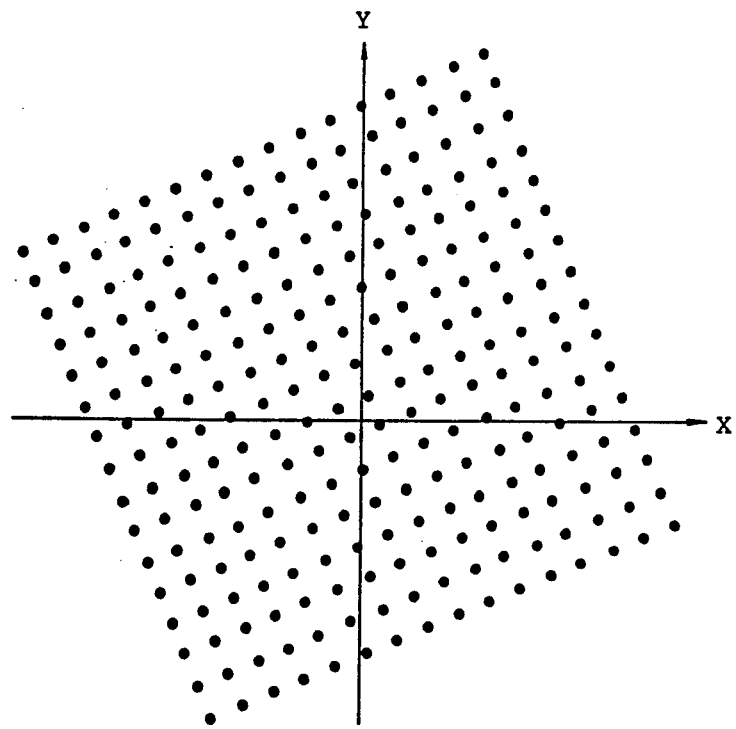
FIG. 7 is a view for use in describing signal points of a phase-rotated signal.
Figure 8:
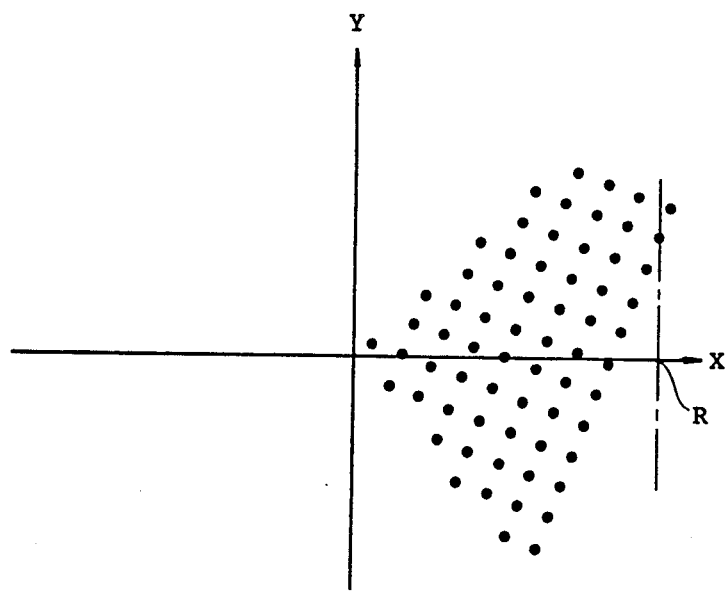
FIG. 8 shows signal points for use in describing another operation of a clockwise rotating circuit illustrated in FIG. 5.

If the phase-rotated signal is specified by signal points on the phase plane that are arranged with phase-rotated state around the origin counterclockwise as shown in FIG. 7, the clockwise rotated signal is specified by signal points on the phase plane as shown in FIG. 8. Under the circumstances, the time-averaged signal has a positive time-averaged value.

Figure 9:
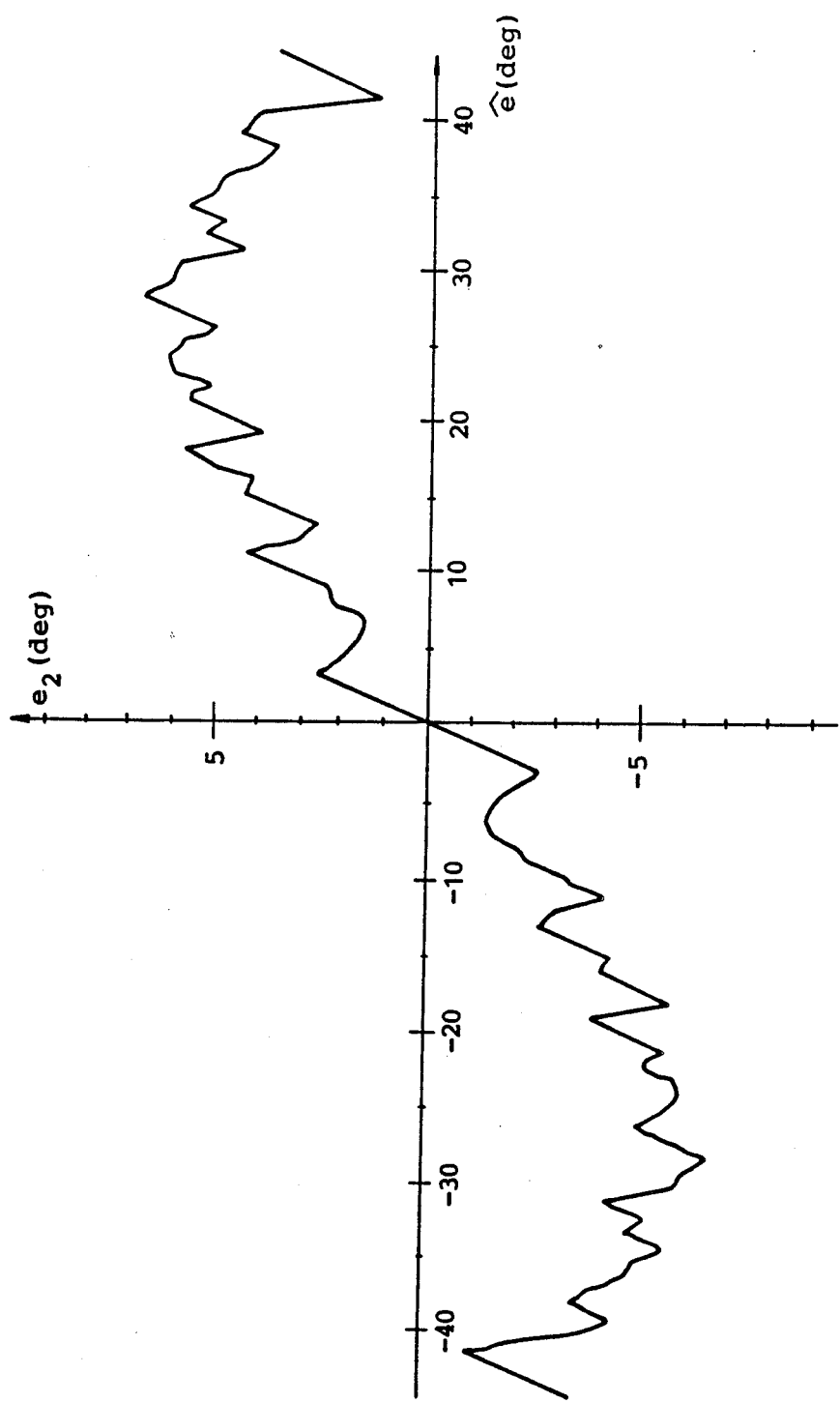
FIG. 9 shows a phase estimation characteristic of a second carrier phase extracting circuit shown in FIG. 5.

Referring to FIG. 9, the abscissa and the ordinate represent a carrier phase error value ê and the second carrier phase estimated error value $e_2$. FIG. 9 shows another phase estimation characteristic of the second carrier phase extracting circuit 50 shown in FIG. 5. As shown in FIG. 9, the second carrier phase estimated error value $e_2$ does not become small even though the carrier phase error value ê exceeds a range between about −6 (deg) and about +6 (deg). Accordingly, the carrier phase synchronizing circuit 30 can immediately recover the carrier phase synchronization even though the carrier phase error value ê exceeds the range between about −6 (deg) and about +6 (deg).

Figure 10:
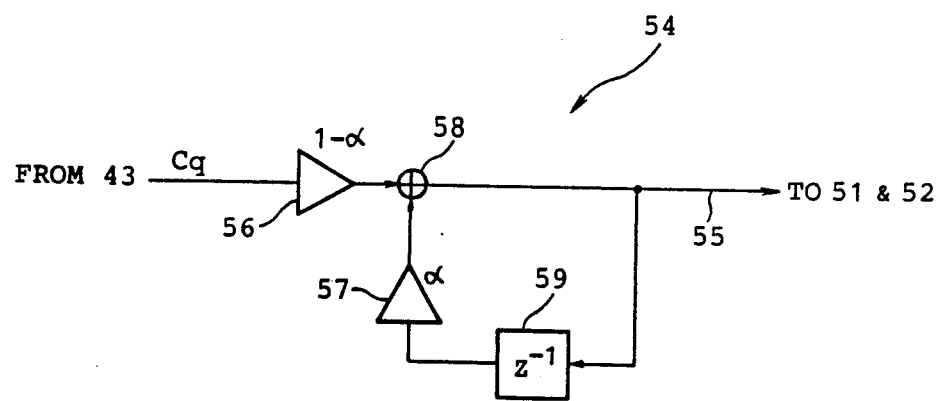
FIG. 10 is a block diagram of an averaging circuit for use in a second carrier phase synchronizing circuit illustrated in FIG. 5.

Referring to FIG. 10, the averaging circuit 54 comprises first and second coefficient multipliers 56 and 57, a multiplier 58, and a delay circuit 59. The first coefficient multiplier 56 multiplies the quadrature component Cp of the clockwise rotated signal by a first coefficient $(1-\alpha)$ to produce a first product signal. The multiplier 58 multiplies the first product signal by a second product signal supplied from the second coefficient multiplier 57 to produce a multiplied signal. The delay circuit 59 delays the multiplied signal by a unit delay time to produce a delayed signal. The second coefficient multiplier 57 multiplies the delayed signal by a second coefficient $\alpha$ to produce the second product signal. The multiplied signal is produced as the second carrier phase error estimation signal. That is, the averaging circuit 54 has a transfer function H(z) which is equal to a ratio of the z-transform of the second carrier phase error estimation signal to that of the quadrature component Cp of the clockwise rotated signal as follows:

$$H(z) = (1-\alpha)/(1-\alpha Z^{-1}).$$

Figure 11:
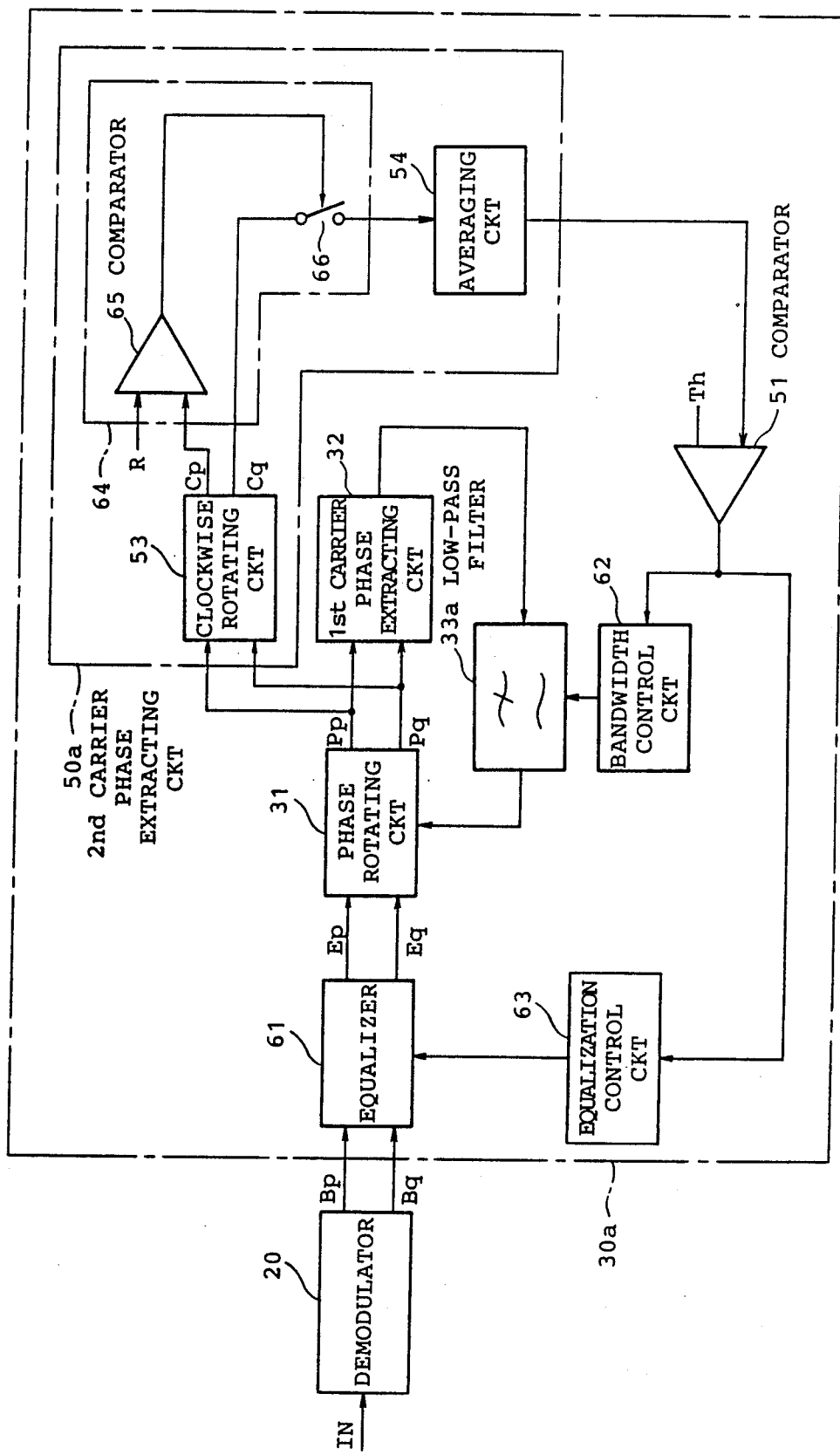
FIG. 11 is a block diagram of a receiver including a carrier phase synchronizing circuit according to a second embodiment of this invention.

Referring to FIG. 11, another phase synchronizing circuit 30a is similar to that illustrated in FIG. 5 except that the second carrier phase extracting circuit and the low-pass filter are modified from those illustrated in FIG. 5 and that the phase synchronizing circuit 30a further comprises an equalizer 61, a bandwidth control circuit 62, and an equalization control circuit 63 as will later become clear. The second carrier phase extracting circuit and the low-pass filter are therefore depicted at 50a and 33a.

The equalizer 61 has varying correction coefficients and is supplied with the demodulated signal from the demodulator 20. The equalizer 61 equalizes the demodulated signal into an equalized signal in response to a coefficient control signal. The equalized signal comprises an in-phase equalized component Ep and a quadrature equalized component Eq. The equalized signal is supplied to the phase rotating circuit 31.

The second carrier phase extracting circuit 50a comprises a selector 64 which is inserted between the clockwise rotating circuit 53 and the averaging circuit 54.

Additionally referring temporarily to FIGS. 6 and 8 again, the selector 64 selects the quadrature component Cq of the clockwise rotated signal to produce a selected rotated signal when the in-phase component Cp of the clockwise rotated signal has a value which is greater than a predetermined value R. The selected rotated signal is supplied to the averaging circuit 54. More specifically, the selector 64 comprises a comparator 65 and a switch 66. The comparator 65 compares the in-phase components Cp of the clockwise rotated signal with the predetermined value R to produce a switch close signal which closes the switch 66 when the in-phase component Cp of the clockwise rotated signal is greater than the predetermined value R. When the switch 66 is closed, the in-phase component Cp of the clockwise rotated signal is supplied through the switch 66 to the averaging circuit 54 as the selected rotated signal. In other words, the selector 64 extracts extracted signal points form the signal points shown in FIGS. 6 and 8. Each of the extracted signal points has the in-phase component Cp greater than the predetermined value R. Therefore, the extracted signal points are equal to the signal points shown in FIGS. 6 and 8 except for signal points which are present nearer on the phase plane to the origin than the extracted signal points. As a result, the averaging circuit 54 of the second carrier phase extracting circuit 50a can produce the time-averaged signal which is more precise than that for the averaging circuit 54 of the second carrier phase extracting circuit 50 shown in FIG. 5.

The low-pass filter 33a has a controllable passband and is connected to the first carrier phase error extracting circuit 32. The low-pass filter 33a produces the phase rotation control signal by carrying out another low-pass filtering operation on the first carrier phase error estimation signal with the controllable passband controlled by a bandwidth control signal which will presently be described. The low-pass filter 33a is connected to the bandwidth control circuit 62 which is connected to the comparator 51. The bandwidth control circuit 62 controls the low-pass filter 33a in response to the comparison result signal to produce the bandwidth control signal. More particularly, the bandwidth control circuit 62 controls the low-pass filter 33a so as to expand the controllable passband when the comparison result represents that the second carrier phase estimated error value $e_2$ is greater than the threshold value Th. Otherwise, the bandwidth control circuit 62 controls the low-pass filter 33a so as to narrow the controllable passband.

The equalization control circuit 63 is connected to the equalizer 61 and the comparator 51. The equalization control circuit 63 controls the equalizer 61 in response to the comparison result signal to produce the coefficient control signal. More specifically, the equalization control circuit 63 controls the equalizer 61 to make the equalizer 61 carry out a correction operation when the comparison result represents that the second carrier phase estimated error value $e_2$ is less than the threshold value Th. Otherwise, the equalization control circuit 63 controls the equalizer 61 to stop the correction operation.

What is claimed is:

1. A carrier phase synchronizing circuit for use in a receiver for receiving a quadrature amplitude modulated signal as a received signal, said quadrature amplitude modulated signal being specified by a plurality of signal points on a phase plane having an origin and real and imaginary axes orthogonally crossing at said origin, said signal points being in one-to-one correspondence to a plurality of signal values, said quadrature amplitude modulated signal carrying a transmission data signal representative of a variable which is equal to one of said signal values at a time, said receiver comprising a demodulating means for demodulating said received signal into a demodulated signal, wherein the improvement comprises:
    phase rotating means connected to said demodulating means for phase rotating said demodulated signal on said phase plane around said origin in response to a control signal to produce a phase-rotated signal indicative of a phase-rotated value;
    first carrier phase error extracting means connected to said phase rotating means for carrying out a first predetermined extracting operation on said phase-rotated signal to produce a first carrier phase error estimation signal indicative of a first carrier phase estimated error value which is equal to a difference between said variable and said phase-rotated value;
    second carrier phase error extracting means connected to said phase rotating means for carrying out a second predetermined extracting operation on said phase-rotated signal to produce a second carrier phase error estimation signal indicative of a second carrier phase estimated error value which is equal to another difference between said variable and said phase-rotated value;
    comparing means connected to said second carrier phase error extracting means for comparing said second carrier phase estimated error value with a threshold value to produce a comparison result signal representative of a comparison result;
    selecting means connected to said comparing means and to said first and said second carrier phase error extracting means for selecting one of said first and said second carrier phase error estimation signals as a selected carrier phase error estimation signal in response to said comparison result signal; and
    low-pass filtering means connected to said selecting means for carrying out a low-pass filtering operation on said selected carrier phase error estimation signal to produce said control signal.

2. A carrier phase synchronizing circuit as claimed in claim 1, wherein said selecting means selects said first carrier phase error estimation signal as said selected carrier phase error estimation signal when said comparison result represents that said second carrier phase estimated error value is less than said threshold value, said selecting means selecting said second carrier phase error estimation signal as said selected carrier phase error estimation signal when said comparison result represents that said second carrier phase estimated error value is greater than said threshold value.

3. A carrier phase synchronizing circuit as claimed in claim 1, wherein said first carrier phase error extracting means comprises:
    detecting means connected to said phase rotating means for detecting, as a detected value, one of said signal values that is nearest to said phase-rotated value, said detecting means producing a detected signal indicative of said detected value;

calculating means connected to said phase rotating means and to said detecting means for calculating a calculated error value which is equal to a difference between said detected value and said phase-rotated value, said calculating means producing a calculated error signal indicative of said calculated error value; and producing means connected to said calculating means for producing said calculated error signal as said first carrier phase error estimation signal.

4. A carrier phase synchronizing circuit as claimed in claim 1, said phase plane being divided into first through fourth quadrants, wherein said second carrier phase error extracting means comprises:

clockwise rotating means connected to said phase rotating means for rotating said phase-rotated signal on said phase plane clockwise around said origin by an angle of (90n−45) degrees when said phase-rotated signal is present on an n-th quadrant where n is variable between 1 and 4, said clockwise rotating means producing a clockwise rotated signal which has an in-phase and a quadrature component on said real and said imaginary axes, respectively;

averaging means connected to said clockwise rotating means for time averaging said quadrature component of the clockwise rotated signal to produce a time-averaged signal; and producing means connected to said averaging means for producing said time-averaged signal as said second carrier phase error estimation signal.

5. A carrier phase synchronizing circuit for use in a receiver for receiving a quadrature amplitude modulated signal as a received signal, said quadrature amplitude modulated signal being specified by a plurality of signal points on a phase plane having an origin and real and imaginary axes orthogonally crossing at said origin, said signal points being in one-to-one correspondence to a plurality of signal values, said quadrature amplitude modulated signal carrying a transmission data signal representative of a variable which is equal to one of said signal values at a time, said receiver comprising a demodulating means for demodulating said received signal into a demodulated signal, wherein the improvement comprises:

phase rotating means connected to said demodulating means for phase rotating said demodulated signal on said phase plane around said origin in response to a phase rotation control signal to produce a phase-rotated signal indicative of a phase-rotated value;

first carrier phase error extracting means connected to said phase rotating means for carrying out a first predetermined extracting operation on said phase-rotated signal to produce a first carrier phase error estimation signal indicative of a first carrier phase estimated error value which is equal to a difference between said variable and said phase-rotated value;

low-pass filtering means having a controllable passband and connected to said first carrier phase error extracting means for carrying out a low-pass filtering operation on said first carrier phase error estimation signal with said controllable passband controlled by a bandwidth control signal to produce said phase rotation control signal;

second carrier phase error extracting means connected to said phase rotating means for carrying out a second predetermined extracting operation on said phase-rotated signal to produce a second carrier phase error estimation signal indicative of a second carrier phase estimated error value which is equal to another difference between said variable and said phase-rotated value;

comparing means connected to said second carrier phase error extracting means for comparing said second carrier phase estimated error value with a threshold value to produce a comparison result signal representative of a comparison result; and bandwidth control means connected to said comparing means and to said low-pass filtering means for controlling said low-pass filtering means in response to said comparison result signal to produce said bandwidth control signal.

6. A carrier phase synchronizing circuit as claimed in claim 5, wherein said bandwidth control means controls said low-pass filtering means so as to expand said controllable passband when said comparison result represents that said second carrier phase estimated error value is greater than said threshold value, said bandwidth control means controlling said low-pass filtering means so as to narrow said controllable passband when said comparison result represents that said second carrier phase estimated error value is less than said threshold value.

7. A carrier phase synchronizing circuit as claimed in claim 5, wherein said first carrier phase error extracting means comprises:

detecting means connected to said phase rotating means for detecting, as a detected value, one of said signal values that is nearest to said phase-rotated value, said detecting means producing a detected signal indicative of said detected value;

calculating means connected to said phase rotating means and to said detecting means for calculating a calculated error value which is equal to a difference between said detected value and said phase-rotated value, said calculating means producing a calculated error signal indicative of said calculated error value; and producing means connected to said calculating means for producing said calculated error signal as said first carrier phase error estimation signal.

8. A carrier phase synchronizing circuit as claimed in claim 5, said phase plane being divided into first through fourth quadrants, wherein said second carrier phase error extracting means comprises;

clockwise rotating means connected to said phase rotating means for rotating said phase-rotated signal on said phase plane clockwise around said origin by an angle of (90n−45) degrees when said phase-rotated signal is present on an n-th quadrant where n is variable between 1 and 4, said clockwise rotating means producing a clockwise rotated signal which has an in-phase and a quadrature component on said real and said imaginary axes, respectively;

selecting means connected to said clockwise rotating means for selecting, as a selected rotated signal, one of said quadrature component of the clockwise rotated signal when said in-phase component of the clockwise rotated signal has a value which is greater than a predetermined value;

averaging means connected to said selecting means for time averaging said selected rotated signal to produce a time-averaged signal; and producing means connected to said averaging means for producing said time-averaged signal as said second carrier phase error estimation signal.

9. A carrier phase synchronizing circuit for use in a receiver for receiving a quadrature amplitude modulated signal as a received signal, said quadrature amplitude modulated signal being specified by a plurality of signal points on a phase plane having an origin and real and imaginary axes orthogonally crossing at said origin, said signal points being in one-to-one correspondence to a plurality of signal values, said quadrture amplitude modulated signal carrying a transmission data signal representative of a variable which is equal to one of said signal values at a time, said receiver comprising demodulating means for demodulating said received signal into a demodulated signal, wherein the improvement comprises:

equalizing means having varying correction coefficients and connected to said demodulating means for equalizing said demodulated signal into an equalized signal in response to a coefficient control signal;

phase rotating means connected to said equalizing means for phase rotating said demodulated signal on said phase plane around said origin in response to a phase rotation control signal to produce a phase-rotated signal indicative of a phase-rotated value;

first carrier phase error extracting means connected to said phase rotating means for carrying out a first predetermined extracting operation on said phase-rotated signal to produce a first carrier phase error estimation signal indicative of a first carrier phase estimated error value which is equal to a difference between said variable and said phase-rotated value;

low-pass filtering means having a controllable passband and connected to said first carrier phase error extracting means for carrying out a low-pass filtering operation on said first carrier phase error estimation signal with said controllable-passband controlled by a bandwidth control signal to produce said phase rotation control signal;

second carrier phase error extracting means connected to said phase rotating means for carrying out a second predetermined extracting operation on said phase-rotated signal to produce a second carrier phase error estimation signal indicative of a second carrier phase estimated error value which is equal to another difference between said variable and said phase-rotated value;

comparing means connected to said second carrier phase error extracting means for comparing said second carrier phase estimated error value with a threshold value to produce a comparison result signal representative of a comparison result;

bandwidth control means connected to said comparing means and to said low-pass filtering means for controlling said low-pass filtering means in response to said comparison result signal to produce said bandwidth control signal; and equalization control means connected to said comparing means and to said equalizing means for controlling said equalizing means in response to said comparison result signal to produce said coefficient control signal.

10. A carrier phase synchronizing circuit as claimed in claim 9, wherein said equalization control means controls said equalizing means to make said equalizing means carry out a correction operation when said comparison result represents that said second carrier phase estimated error value is less than said threshold value, said equalization control means controlling said equalizing means to stop said correction operation when said comparison result represents that said second carrier phase estimated error value is greater than said threshold value.

* * * * *